Oct. 7, 1930.                G. O. WILMS                1,777,988
                       RHEOSTATIC MOTOR CONTROLLER
                      Filed Dec. 27, 1926        2 Sheets-Sheet 1
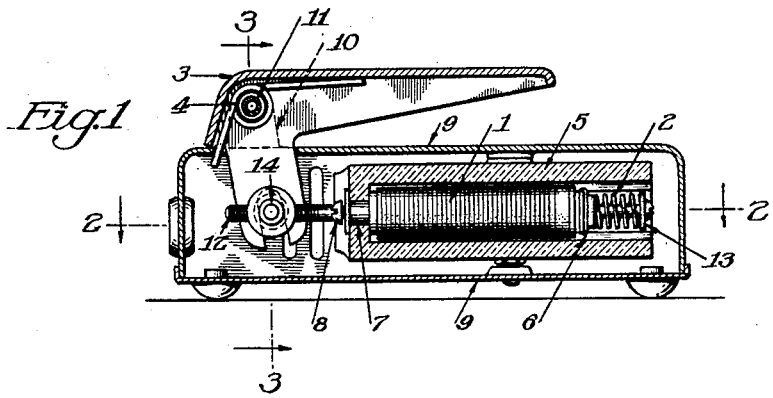
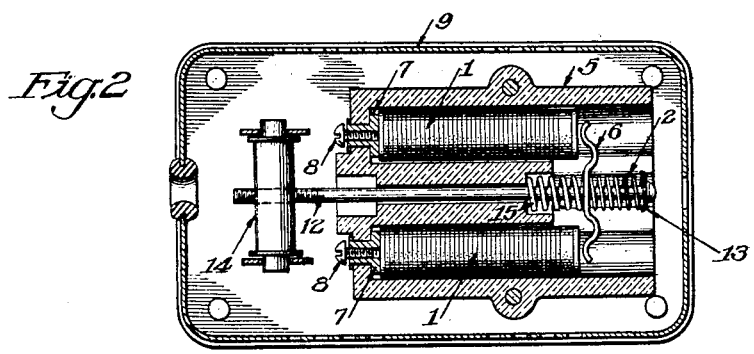
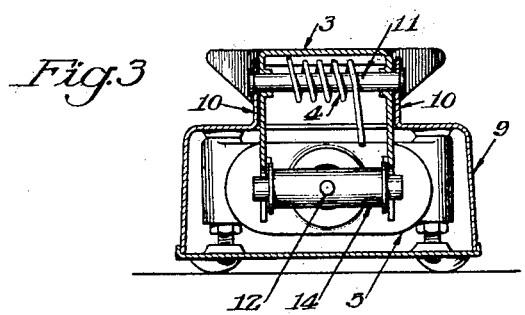
INVENTOR
*Gustav O. Wilms*
BY
ATTORNEY

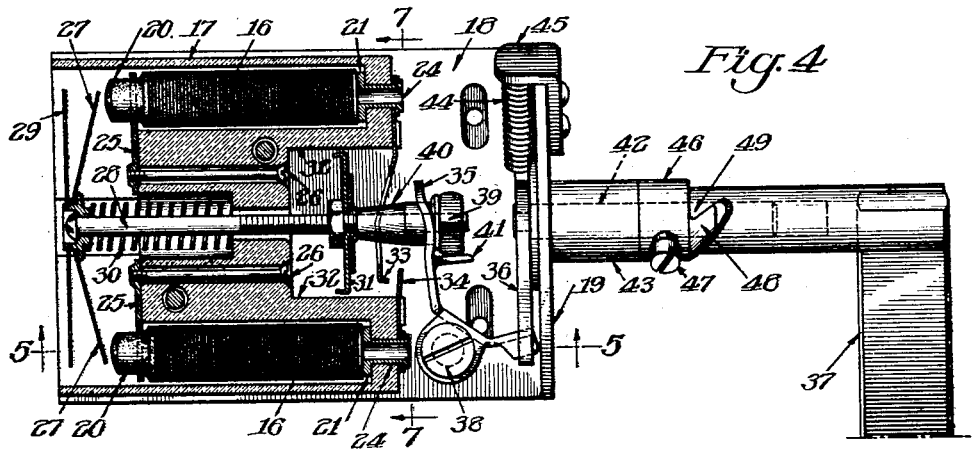

Patented Oct. 7, 1930

1,777,988

UNITED STATES PATENT OFFICE

GUSTAV O. WILMS, OF MILWAUKEE, WISCONSIN, ASSIGNOR, BY MESNE ASSIGNMENTS, TO RELIANCE COMPANY, OF WILMINGTON, DELAWARE, A CORPORATION OF DELAWARE

RHEOSTATIC MOTOR CONTROLLER

Application filed December 27, 1926, Serial No. 157,157, and in Great Britain December 28, 1925.

The invention relates to a rheostatic motor controller.

The particular rheostatic motor controller to which the invention applies employs a carbon disk or other compressible resistor having the pressure thereon controlled by a pivoted lever actuator.

Such a controller, as it existed prior to the invention set forth herein, was incapable of giving a gradual and controllable variation in resistance above a low and narrow range, as its gradual and controllable variation in resistance depended upon its resistor being compressible and having a high pressure varied thereon.

Accordingly, it was not suitable or sufficient to be employed to control fractional horsepower electric motors or for other purposes which require a gradual and controllable variation in resistance through a high and wide range.

The invention has as its object to provide a carbon disk controller in which a gradual and controllable variation in resistance may be obtained through a high and wide range.

Another object is to provide a carbon disk controller in which a small resistor will give a gradual and controllable variation in resistance through a high and wide range.

Another object is to provide a small and compact motor controller for fractional horsepower motors and other purposes which require a gradual and controllable variation in resistance through a high and wide range.

According to the present invention, a pivoted lever actuator having a spring to enable its lever to be given a gradual movement and retained in any intermediate position is employed to vary the pressure upon a carbon disk or other compressible resistor through a low tension spring proportioned to vary a low pressure upon the resistor and allow the lever to have a wide and substantial movement in varying the low pressure and thereby obtain a gradual and controllable variation in a high resistance through a wide range above the normal gradual and controllable variation in a low resistance obtainable by variations in a high pressure upon the resistor.

The invention which is herein set forth provides a rheostatic motor controller by which a fractional horsepower electric motor may be controlled to obtain a wide and gradual variation in its speed from a low speed to a high speed, but such controller may be employed for various other purposes.

The present application is a continuation of co-pending applications of applicant Serial No. 458,525, filed April 4, 1921, Serial No. 574,803, filed July 13, 1922, Patent No. 1,631,111, May 31, 1927, and Serial No. 652,965, filed July 21, 1923, as to any matter set forth or claimed herein and disclosed in these prior applications.

The accompanying drawings illustrate two motor controllers in which the invention is employed, and the views therein are as follows:

Fig. 1 is a sectional side view of a controller in which the actuator is provided with a treadle for operating it by the foot;

Fig. 2 is a sectional plan view on the line 2—2 of Fig. 1;

Fig. 3 is a sectional end view on the line 3—3 of Fig. 1;

Fig. 4 is a sectional plan view of a controller in which the actuator is provided with a lever for operating it by the knee;

Fig. 5 is a sectional side view on the line 5—5 of Fig. 4;

Fig. 6 is a front end view;

Fig. 7 is a sectional end view on the line 7—7 of Fig. 4; and

Fig. 8 is a rear end view.

*Controller, Figs. 1 to 3*

The controller is provided with two compressible resistors 1, a low tension resistor spring 2 to apply pressure to the resistors and control the resistance thereof, a pivoted lever actuator 3 to deflect the low tension spring and vary the tension thereof, and an actuator spring 4 to control the actuator.

The two resistors are arranged parallel to each other in an insulating casing 5 and merely have sufficient disks to obtain a low voltage drop between adjacent disks of the order of one ohm or less.

The low tension resistor spring applies pressure through a yoke or bridge 6 to the resistors and thereby controls the resistance.

This spring may be deflected through a wide range, but its tension and pressure is always low.

Accordingly, it allows the actuator lever to be moved through a wide range in varying the resistance and enables the resistance to be given a gradual and controllable variation and accurate adjustment throughout a high and wide range above the normal gradual and controllable variation in a low resistance obtainable by variation in a high pressure upon the resistor.

If the pressure were applied to the resistors directly from the actuator or through a high tension spring, as in the previous carbon disk controllers, the resistance would vary quickly and abruptly above a low narrow range in which the resistor itself naturally and inherently gradually varies its resistance, and further, the actuator would have a very limited movement and the resistance could not be gradually varied through a wide range.

The resistors bear against stationary terminals 7 which are fastened to the casing and provided with binding screws 8.

The insulating casing is removably mounted within a frame or casing 9 which has its top provided with lugs 10 to support a pivot pin 11 for the actuator.

The actuator is provided with a pedal or treadle for operating it by the foot.

Its movement is controlled by the spring 4, and this spring, which in this controller is a high tension spring, has sufficient reaction to enable the operator to move the actuator gradually and readily hold it in any intermediate position.

The actuator and the resistor spring are connected by a connecting or pull rod 12.

The resistor spring is arranged upon the pull rod between a head 13 and the yoke 6, and the rod is connected to the actuator by a cross-pin 14 arranged in slots therein.

The yoke 6 is free to tilt upon the connecting rod to equalize the pressure upon the resistors, and it is normally retracted from the resistors by a return spring 15 which bears upon a seat in the casing.

The return spring acts in opposition to the resistor spring upon the yoke 6 and thereby lessens the pressure exerted by the resistor spring upon the resistors.

The pull-rod is threaded into the cross-pin and may be turned to adjust the position of the yoke.

When the actuator is in its initial position, the circuit through the resistors is opened by the yoke or bridge 6.

When it is moved to operate the controller, the yoke or bridge engages the resistors and then current flows through the resistors from one terminal to the other.

The controller set forth herein is suitable for controlling small or fractional horse-power electric motors, or for other purposes which require a resistance that may be gradually varied and accurately adjusted through a high and wide range.

Of course, many different controllers may be devised in which the present invention is embodied, and another controller in which the invention is employed is hereinafter explained.

Controller, Figs. 4 to 8

The controller in Figs. 4 to 8 operates upon the same principle as the controller which has already been explained.

It is provided with two resistors 16 arranged parallel to each other within an insulating casing 17.

The insulating casing is removably fastened upon a base or frame 18 having a bracket 19.

The resistors are arranged between movable studs or plungers 20 and stationary terminals 21.

The stationary terminals are electrically connected to contact plates 22 having binding screws 23 and the same are provided with ferrules 24 by which the contact plates are fastened in place.

The plungers are held against the resistors by adjusting plates 25 which are fastened to the casing by screws 26.

These plates may be bent to adjust the initial resistance of the resistors, and that may be readily accomplished by applying pressure to the resistors by an instrument inserted through the ferrules of the stationary terminals.

The pressure upon the resistors is controlled and varied by a flat low tension resistor spring 27 mounted upon connecting or pull-rod 28.

When the resistor spring is deflected to apply its maximum pressure, it engages a supplemental flat spring plate 29 which applies additional pressure to further reduce the resistance.

The resistor spring is retracted from the plungers by a return spring 30 arranged upon the connecting rod between the resistor spring and the casing.

The connecting rod carries the guide 31 which is arranged between ways 32 on the casing.

When the resistance has been reduced to its working limit, the resistors are removed from circuit by a switch 33 which is brought into engagement with a stationary contact 34 by the guide 31.

The switch is connected to one stationary terminal and the stationary contact to the other stationary terminal, and they are fastened to the casing by the ferrules of these terminals.

The particular actuator illustrated in Figures 4 to 8 is not claimed as a part of the invention set forth herein and it is disclosed in Chason Patent No. 1,643,292, September 27, 1927.

This actuator is provided with a pivoted crank lever 35, a cam 36 and an operating lever 37.

The crank lever is pivotally mounted upon a post or pin 38 carried by the base or frame 18.

The connecting rod is connected to the crank lever by an insulating nut 39 which has this rod threaded into its shank 40.

The nut is held from turning by engagement with a lock or lug 41 formed on the crank lever.

The resistor spring may have its initial position adjusted by removing the nut from engagement with its lock and then turning it upon the connecting rod.

The cam 36 is carried in a shaft 42 which turns in a bearing 43 upon the bracket 19.

The actuator has its movement controlled by an actuator spring 44.

This spring is arranged between a seat or lug 45 and the cam.

The operating arm is detachably connected to the cam shaft by a coupling ring 46 which is fastened to the shaft by a set screw 47 and provided with a hook 48 which engages another hook 49 upon the operating arm.

When the controller is in operation to vary the resistance, the resistor spring 27 engages the resistors and connects the same in circuit in series, as in the other controller.

The operating lever 37, through the cam 36, crank lever 35 and connecting rod 28, operates the resistor spring 27 to vary the pressure upon the resistors and gradually vary the resistance thereof.

When the resistance has been reduced to its working limit, the resistors are removed from circuit by the short-circuiting switch 33.

If the controller in Figs. 1 to 4 be provided with a low tension spring of such capacity as to deflect about .02 inches to .20 inches in varying a pressure of the order of .10 to .50 lbs. a gradual and controllable variation in resistance of the order of 150 ohms to 50 ohms may be obtained and if the controller in Figs. 4 to 8 be provided with a low tension spring of such capacity as deflects about .04 to .20 inches in varying a pressure of the order of .03 to .25 lbs. a gradual and controllable variation in resistance of the order of 400 ohms to 100 ohms may be obtained.

Of course, the capacity of a low tension spring may be varied according to the range of gradual and controllable variations in resistance required.

The invention set forth herein provides a controller which is simple, compact and efficient, and which may be employed for purposes in practice for which the previous carbon disk controllers were not suitable or sufficient.

The invention is hereby claimed as follows:

1. A rheostatic controller comprising in combination a carbon disk resistor, an actuator having a pivoted operating lever and a spring to enable said lever to be given a gradual movement and retained in any intermediate position, and means for varying a low pressure upon said resistor and allowing said lever to have a wide or substantial movement in varying said low pressure and thereby enabling a gradual variation in a high resistance to be obtained throughout a wide range above the normal gradual variation in a low resistance obtainable by variation in a high pressure upon said resistor.

2. A rheostatic controller comprising in combination a carbon disk resistor, an actuator having a pivoted operating lever and a spring to enable said lever to be given a gradual movement and retained in any intermediate position and means actuated by said actuator to vary a low pressure upon said resistor by a low-tension spring proportioned to allow said lever to have a wide or substantial movement in varying said low pressure and thereby enable a gradual variation in resistance to be obtained throughout a wide range above the normal gradual variation in a low resistance obtainable by variations in a high pressure upon said resistor.

3. A rheostatic controller comprising in combination a carbon disk resistor, an actuator having a pivoted operating lever and a spring to enable said lever to be given a gradual movement and retained in any intermediate position, means actuated by said actuator to vary a low pressure upon said resistor by a low-tension spring proportioned to allow said lever to have a wide or substantial movement in varying said low pressure and thereby enable a gradual variation in resistance to be obtained throughout a wide range above the normal gradual variation in a low resistance obtainable by variations in a high pressure upon said resistor, and means actuated by said actuator to connect said resistor in circuit upon applying initial pressure thereto and removing said resistor from circuit after the resistance thereof has been decreased by pressure.

4. A rheostatic controller comprising in combination a carbon disk resistor, an actuator having a pivoted operating lever and a spring to enable said lever to be given a gradual movement and retained in any intermediate position, and means actuated by said actuator to vary pressure upon said resistor and including a low-tension spring to vary a low pressure upon said resistor and thereby enable a gradual variation in resistance to be obtained throughout a wide upper range and a higher-tension spring to vary a higher pressure upon said resistor and thereby enable a gradual variation in resistance to be obtained throughout a wide continuing lower range.

5. A rheostatic controller comprising in combination two carbon disk resistors arranged parallel to each other, an actuator having a pivoted operating lever and a spring to enable said lever to be given a gradual movement and retained in any intermediate position, and means actuated by said actuator to vary a low pressure upon said resistors by a low-tension spring proportioned to allow said lever to have a wide or substantial movement in varying said low pressure and thereby enable a gradual variation in resistance to be obtained throughout a wide range above the normal gradual variation in a low resistance obtainable by variation in a high pressure upon said resistors.

6. A rheostatic controller comprising in combination two carbon disk resistors arranged parallel to each other, an actuator having a pivoted operating lever and a spring to enable said lever to be given a gradual movement and retained in any intermediate position, means actuated by said actuator to vary a low pressure upon said resistors by a low-tension spring proportioned to allow said lever to have a wide or substantial movement in varying said low pressure and thereby enable a gradual variation in resistance to be obtained throughout a wide range above the normal gradual variation in a low resistance obtainable by variation in a high pressure upon said resistors, and means actuated by said actuator to connect said resistors in circuit in series between circuit terminals therefor and removing said resistors from circuit after the resistance thereof has been decreased by pressure.

7. A rheostatic controller comprising in combination two carbon disk resistors arranged parallel to each other, an actuator having a pivoted operating lever and a spring to enable said lever to be given a gradual movement and retained in any intermediate position, and means actuated by said actuator to vary a low pressure upon said resistors by a flat low-tension spring having its ends applying pressure to said resistors and proportioned to allow said lever to have a wide or substantial movement in varying said low pressure and thereby enable a gradual variation in resistance to be obtained throughout a wide range above the normal gradual variation in a low resistance obtainable by variation in a high pressure upon said resistors.

8. A rheostatic controller comprising in combination two carbon disk resistors arranged parallel to each other, an actuator having a pivoted operating lever and a spring to enable said lever to be given a gradual movement and retained in any intermediate position, and a flat low-tension spring having each end thereof vary pressure upon a resistor by said actuator deflecting said spring.

9. A rheostatic controller comprising in combination two carbon disk resistors arranged parallel to each other, an actuator having a pivoted operating lever and a spring to enable said lever to be given a gradual movement and retained in any intermediate position, a flat low-tension spring having each end thereof vary pressure upon a resistor by said actuator deflecting said spring, and a supplemental plate arranged behind said low-tension spring to apply a higher pressure to said resistors after said low-tension spring has increased a low pressure upon said resistors.

10. A rheostatic controller comprising in combination two carbon disk resistors arranged parallel to each other, an actuator having a pivoted operating lever and a spring to enable said lever to be given a gradual movement and retained in any intermediate position, a flat low-tension spring having each end thereof vary pressure upon a resistor by said actuator deflecting said spring, and a connecting rod arranged between said resistors and connecting said low-tension spring to said actuator.

11. A rheostatic controller comprising in combination two carbon disk resistors arranged parallel to each other, an actuator having a pivoted operating lever and a spring to enable said lever to be given a gradual movement and retained in any intermediate position, a flat low-tension spring having each end thereof vary pressure upon a resistor by said actuator deflecting said spring, a supplemental plate arranged behind said low-tension spring to apply a higher pressure to said resistors after said low-tension spring has increased a low pressure upon said resistors, and a connecting rod arranged between said resistors and connecting said low-tension spring and supplemental plate to said actuator.

12. A rheostatic controller comprising in combination two carbon disk resistors arranged parallel to each other, an actuator having a pivoted operating lever and a spring to enable said lever to be given a gradual movement and retained in any intermediate position, a flat low-tension spring actuated by said actuator to vary a low pressure upon said resistors and proportioned to allow said lever to have a wide or substantial movement in varying said low pressure and thereby enable a gradual variation in resistance to be obtained throughout a wide upper range, and a flat higher-tension spring actuated by said actuator to vary a higher pressure upon said resistors and thereby enable a gradual variation in resistance to be obtained throughout a wide continuing lower range.

In witness whereof, I have hereunto subscribed my name.

GUSTAV O. WILMS.